(No Model.)
J. MALLEN.
PULLEY.
No. 262,445. Patented Aug. 8, 1882.
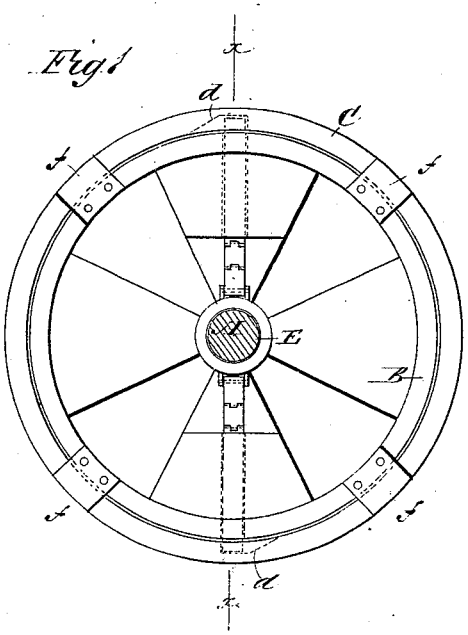
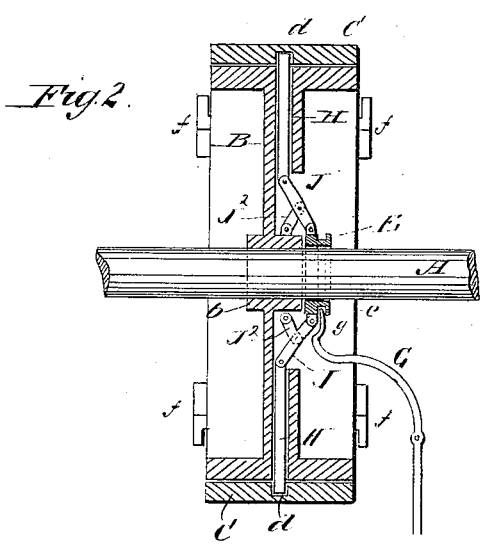
WITNESSES:
Francis McArdle
C. Sedgwick
INVENTOR:
J. Mallen
BY Munn & Co
ATTORNEYS.

UNITED STATES PATENT OFFICE.

JAMES MALLEN, OF WELLSVILLE, OHIO.

PULLEY.

SPECIFICATION forming part of Letters Patent No. 262,445, dated August 8, 1882.

Application filed March 20, 1882. (No model.)

*To all whom it may concern:*

Be it known that I, JAMES MALLEN, of Wellsville, in the county of Columbiana and State of Ohio, have invented a certain new and useful Improvement in Pulleys, of which the following is a full, clear, and exact description.

My invention relates to a pulley which is more particularly intended for driving sewing-machines and other light machinery, but is applicable to machinery of various kinds.

The invention consists essentially in a fast pulley attached to a shaft, a band or tire surrounding said fast pulley and constituting a loose pulley working in the same plane, and a reversing-lever, sliding collar, toggle-levers, and radially-sliding pins or rods for connecting and disconnecting said fast and loose pulleys, as hereinafter more particularly described.

Reference is to be had to the accompanying drawings, forming part of this specification, in which similar letters of reference indicate corresponding parts in all the figures.

Figure 1 is a side view of a pulley constructed according to my invention. Fig. 2 is a transverse section taken in the line $x\ x$ of Fig. 1.

The fast pulley B is made in skeleton form with a hub, $b$, which is keyed or otherwise secured to the shaft A. The loose pulley consists of a tire-like band, C, which surrounds the fast pulley so as to revolve in the same plane therewith. In the inner surface of the band or loose pulley are notches $d$, each of which has one side abrupt and the other side inclined, like the notch between two ratchet-teeth. Lateral displacement of the loose pulley is prevented by lugs or plates $f$, attached to the rim of the fast pulley and projecting beyond the periphery thereof, as shown in Fig. 1.

On the shaft A, at one side of the hub $b$, is a collar, E, attached to said shaft by a feather, so as turn therewith, but be allowed to slide thereon.

Pivoted to a suitable point on the frame of the machine or elsewhere is a hand-lever, G, the short arm of which is formed into a fork, $g$, and engages with a peripheral groove, $e$, on the collar E, for the purpose of moving said collar back and forth on the shaft.

Pivoted to the collar E at each of two diametrically-opposite sides is the inner end of a bar, J, the outer end of which is pivoted to the inner end of a bar, H, arranged to slide radially in ways provided in the frame of the pulley B, and to protrude through the periphery thereof, as hereinafter described. At each of two corresponding points on the hub $b$ is pivoted the inner end of a shorter bar, J², the outer end of which is pivoted to the bar J, about midway between the ends of the latter. These two bars J J² thus pivoted together form a toggle-joint.

The operation of my invention is as follows: When the parts are in the position shown in Fig. 2 the bars H protrude through the periphery of the fast pulley B, and engage with the notches $d$ in the loose pulley or band C, thus connecting it with said fast pulley so that both will turn together. By moving the lever G so as to slide the collar E outward or away from the hub $b$ the bars H, by means of the toggle-levers J J², are disengaged from the notches $d$ and withdrawn within the periphery of the fast pulley B, so as to allow the loose pulley C to continue its revolutions without turning the fast pulley. If the motion of the pulley is to be in one direction only, the notches $d$ are formed with one side inclined, as shown in Fig. 1, so that if the reverse motion is attempted the bars H will not engage with the notches; but by making the notches with both sides abrupt the pulleys will engage with each other when the motion is in either direction.

By a suitable modification of the construction of the pulley B two of its spokes may be made to operate in place of the bars H, and also the lever G, collar E, and bars J and J² may be dispensed with, and a spiral spring may be used in connection with the pins H to retain them in position, whereby when the motion is reversed the action will be automatic, the end of the pin H sliding up the inclined side of the notches $d$ against the pressure of the spring.

The advantages of my invention are, the loose pulley revolves in the same plane with the fast pulley, and consequently the two pulleys require only half as much space as two pulleys working side by side. There is less wear and friction of the belt, because it does not have to be shifted from one pulley to another.

By duplicating the band or loose pulley and the bars, toggle-joints, sliding collar, and hand-lever the fast pulley may be allowed to carry two loose pulleys, one for a straight belt and the other for a cross-belt, so that the motion may be reversed by disengaging one of the loose pulleys and engaging the other without the necessity for shifting a belt. The loose pulley may be readily removed by taking off the lugs or plates, which are preferably secured to the fast pulley by bolts. Furthermore, the loose pulley may be made of double width, with a duplicate series of notches, so as to enable two fast pulleys on separate shafts to be engaged by one loose pulley and to be operated independently of each other.

Having thus fully described my invention, I claim as new and desire to secure by Letters Patent—

1. The combination, with a fast pulley, of a loose pulley consisting of a plain tire-like band surrounding the said fast pulley, and means, substantially herein shown and described, for securing it upon and engaging and disengaging it with the fast pulley, as set forth.

2. The loose pulley C, consisting of a tire-like band provided with the inclined notches $d$ upon inner side, in combination with the fast pulley B, the bars H, sliding in ways in the fast pulley, and means, substantially as shown and described, for projecting the said bars into the notches of the loose pulley, as set forth.

3. The combination, with the fast pulley B, provided with the lugs or plates $f$, the sliding bars H, and means, substantially as herein shown and described, for operating the said bars, of the loose pulley C, consisting of a tire-like band, and provided with the notches $d$, as and for the purpose set forth.

4. The combination of fast pulley B and the loose pulley or band C, provided with the inclined notches $d$, of the sliding collar E, the sliding bars H, the bar J, pivoted to the said sliding bar and collar, the bar $J^2$, pivoted to the hub of the fast pulley and to the center of the bar J, and the operating-lever G, substantially as and for the purpose set forth.

JAMES MALLEN.

Witnesses:
E. C. TAYLOR,
CHR. CALLEGAN.